United States Patent
McConnell

(10) Patent No.: US 7,984,439 B2
(45) Date of Patent: Jul. 19, 2011

(54) EFFICIENT MECHANISM FOR PREVENTING STARVATION IN COUNTING SEMAPHORES

(75) Inventor: Marcia E. McConnell, Los Altos Hills, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1898 days.

(21) Appl. No.: 11/075,118

(22) Filed: Mar. 8, 2005

(65) Prior Publication Data
US 2006/0206897 A1 Sep. 14, 2006

(51) Int. Cl.
*G06F 9/46* (2006.01)
(52) U.S. Cl. .......................... 718/100; 718/102; 718/104
(58) Field of Classification Search .................. 718/100
See application file for complete search history.

(56) References Cited

U.S. PATENT DOCUMENTS

| | | | | |
|---|---|---|---|---|
| 5,978,867 A | * | 11/1999 | Carmon et al. | 710/25 |
| 6,360,243 B1 | * | 3/2002 | Lindsley et al. | 718/103 |
| 6,470,400 B1 | * | 10/2002 | Carmon et al. | 710/25 |
| 6,757,897 B1 | * | 6/2004 | Shi et al. | 718/102 |
| 7,051,329 B1 | * | 5/2006 | Boggs et al. | 718/104 |
| 7,093,230 B2 | * | 8/2006 | E et al. | 717/100 |
| 7,246,353 B2 | * | 7/2007 | Forin et al. | 718/100 |
| 7,383,368 B2 | * | 6/2008 | Schopp | 710/200 |
| 2002/0099759 A1 | * | 7/2002 | Gootherts | 709/105 |
| 2002/0133530 A1 | * | 9/2002 | Koning | 709/102 |

* cited by examiner

*Primary Examiner* — Emerson C Puente
*Assistant Examiner* — Gregory A Kessler

(57) ABSTRACT

An algorithm for preventing starving threads in a counting semaphore for a computer operating system. The algorithm operates in a stealing mode where threads can steal resources from other threads if none of the threads is starving, and operates in a first-in first-out mode if one or more of the threads becomes starving.

17 Claims, 5 Drawing Sheets

EFFICIENT MECHANISM FOR PREVENTING STARVATION IN COUNTING SEMAPHORES

BACKGROUND OF THE INVENTION

1. Field of the Invention

This invention relates generally to a technique for preventing starving threads in a counting semaphore and, more particularly, to a technique for preventing starving threads in a counting semaphore that includes allowing threads to steal resources from waiting threads until a thread becomes starved.

2. Discussion of the Related Art

Multi-tasking computer operating systems (OS), such as the UNIX operating system, typically employ process algorithms at the kernel level that are referred to as threads. A thread is a portion of code having an object of activity and includes a program counter, a process stack and a set of processor registers. The thread is executed when it receives a command to run the portion of code. The thread needs a central processing unit (CPU) and typically needs a resource, such as a table entry or other data, to execute. A thread is starved if it has been commanded to execute and is waiting for a CPU to become available, but is prevented from executing for an unreasonable period of time or indefinitely because when the CPU becomes available, the resource is not available to the thread because it is being used by another thread executing another portion of code. One or more starving threads could affect system performance, and may prevent other threads from executing that need the starving thread to first execute.

Operating systems of this type also employ locks. A lock is a portion of code that locks resources when the resources are being used by a thread. The thread using the resource locks the lock by decrementing a counter to zero to prevent more than one thread from using the resource. When the thread is done using the resource, the counter is incremented and the lock is unlocked. Thus, the lock prevents multiple threads from simultaneously using the same resource.

A counting semaphore is a sleeping lock that puts a thread into a wait queue until a resource needed by the thread becomes available. Counting semaphores are blocking primitives that are primarily used in a producer/consumer environment. For example, if five resources are available to be used by the threads, each time a thread uses one or more of the resources, the counting semaphore decrements a count indicating that a fewer number of the resources are currently available for other threads. When a thread returns the resource, the counting semaphore increments the count indicating that the resource is now available. If decrementing the count would cause it to go negative, the thread will be blocked or put to sleep on the wait queue until a resource becomes available.

If a resource becomes available to the sleeping thread at the front of the wait queue, the thread is woken up to use the resource. However, depending on what type of thread has been woken up, such as a high priority or low priority thread, a CPU may not be currently available for that thread to execute its code and use the resource. Some algorithms allow new threads that arrive at the semaphore to take available resources so that the resources are being used as much as possible to increase system performance. As mentioned above, when the thread that has been woken up and is waiting for the CPU does get the CPU, resources may not then be available. The woken thread is sent to the end of the queue and put back to sleep. Such a process could cause a starving thread where the thread may never execute, possibly reducing system performance. In this system, there is thus no guarantee that the thread will ever satisfy its request. Thread starvation becomes very complicated when threads decrement the counting semaphore by a large value.

In one known programming technique that avoids starving threads in a counting semaphore, the algorithm "reserves" resources for threads waiting to execute. In other words, a thread that has been woken up because a resource becomes available has that resource reserved for it by immediately decrementing the counter until a CPU becomes available and the thread will actually use the resource. This is a first in-first out (FIFO) operation, where all the sleeping threads in the wait queue will eventually obtain the resource when they are moved to the front of the queue and are woken. However, this reduces system performance because valuable resources may be unused when needed because a thread is holding the resource without using it.

It would be desirable to address both the performance and starvation issues discussed above in a counting semaphore.

SUMMARY OF THE INVENTION

In accordance with the teachings of the present invention, a method is disclosed for allocating resources to threads in a counting semaphore. The method includes operating in a stealing mode where threads can steal resources from other threads if none of the threads is starving, and operating in a first-in first-out mode if one or more of the threads becomes starving.

Additional advantages and features of the present invention will become apparent from the following description and appended claims, taken in conjunction with the accompanying drawings.

DETAILED DESCRIPTION OF THE EMBODIMENTS

Figure 1:
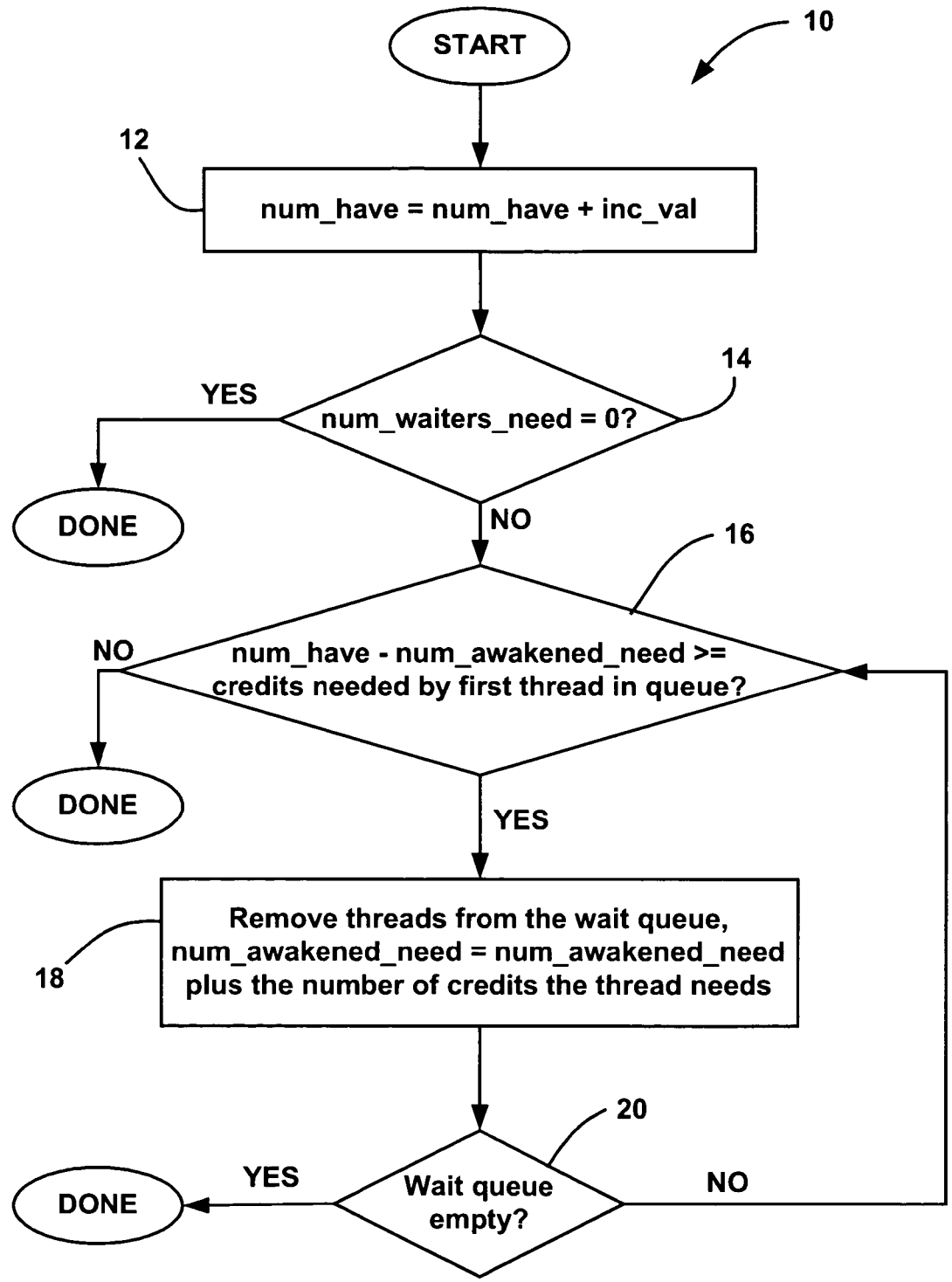
FIG. 1 is a flow chart diagram showing one process for incrementing returned resources in a counting semaphore, according to an embodiment of the present invention.

The following discussion of the embodiments of the invention directed to a process for preventing starving threads in a counting semaphore for a computer operating system is merely exemplary in nature, and is in no way intended to limit the invention or its applications or uses.

The present invention includes an algorithm for an operating system, such as the UNIX operating system, that prevents starving threads and reservation of resources in counting semaphores. As will be appreciated by those skilled in the art, the algorithm is used in conjunction with suitable hardware and software associated with the operating system, including memory caches, registers, device drivers, interfaces, processors, etc.

When there are no starving threads waiting for resources in the semaphore, the semaphore operates in a stealing mode. In the stealing mode, an incoming thread can steal a resource from a thread that has been woken by the semaphore because a resource became available, but has not yet been given a CPU to execute. The number of resources stolen from each thread is counted. When a predetermined maximum number of resources have been stolen from a thread, the thread is designated as starved. If the semaphore includes one or more starving threads, it converts to a FIFO mode, and stealing of resources is not allowed. The starving thread is placed at the front of the wait queue, and all new incoming threads looking for resources are placed at the end of the wait queue. When enough resources become available, the starving thread at the front of the wait queue is woken and the resources are held for it until it executes and returns the resources to the semaphore. As additional resources are returned to the semaphore while the starving thread is waiting for a CPU, those resources are used for the thread at the front of the wait queue. Once the starving thread uses the resources, and no other threads are starving, the semaphore returns to the stealing mode.

Also, a new incoming thread may steal resources from a sleeping thread at the front of the wait queue, where the sleeping thread has yet to be woken because it needs more resources than are currently available. The semaphore increments the stolen resource count of the sleeping thread by the number of resources that were stolen from it. For example, if the thread at the front of the wait queue needs five resources and only four are available, the thread is not woken up. If an incoming thread steals some of the resources that are available, the stolen resource count of the sleeping thread at the front of the queue is incremented by the number of resources that were stolen, possibly making that thread a starving thread where the semaphore will convert to the FIFO mode.

If a woken thread waiting for a CPU also had a resource stolen from it by the same new thread, then the stolen resource count of one or the other of the sleeping thread or the woken thread is incremented. If the incoming thread steals several resources, the stolen resource count of both the sleeping thread and the woken thread may be incremented depending on how many each needed, but the stolen resource counts are only increased by the total number of resources stolen.

As will be discussed in detail below, the counting semaphore algorithm will keep track of the number of resources the sleeping threads and the woken threads have attempted to get from the semaphore, but have failed, including those threads that are asleep on the wait queue and those threads that are awake but waiting for a CPU. The semaphore and also will keep track of the number of resources needed by the threads that have been woken, but have not executed, to more efficiently allocate resources.

As discussed above, the counting semaphore of the invention addresses starvation without reserving resources. In the stealing mode, the counting semaphore is decremented if there are enough resources to satisfy a new thread's request, and there are no starving threads. Otherwise, the decrement fails and the thread is placed at the end of the wait queue of the semaphore. Thus, threads are guaranteed forward progress and execution without giving the resources to sleeping threads. This results in improved performance for heavily contended counting semaphores.

FIGS. 1-3 are flow chart diagrams showing one operation for preventing starving threads in a counting semaphore as discussed above. In these diagrams and the discussion below, the variable num_have is the number of resources that the semaphore currently has available, or the semaphore's count. The variable num_waiters_need is the number of resources that are needed by all of the threads that have attempted to get resources from the semaphore, but have failed, including those threads that are asleep on the wait queue and those threads that are awake but waiting for a CPU. The variable num_awakened_need is the number of resources needed by the threads that have been woken and are no longer on the semaphore's wait queue, but have not had a chance to run on a CPU and decrement the semaphores resource count. The variable inc_val is the number of resources that the semaphore is incremented when a thread returns resources and the variable dec_val is the number of resources that the semaphore is decremented when a thread takes resources.

FIG. 1 is a flow chart diagram 10 showing a process where the number of resources stored in a counting semaphore is incremented by a thread that is returning one or more resources, according to an embodiment of the invention. When a thread returns a resource, the number of resources available in the semaphore is increased by the number of resources that is returned by the thread (num_have=num_have+inc_val) at box 12. The algorithm then determines whether the number of resources needed by the sleeping threads on the semaphore's wait queue and the woken threads waiting for a CPU is zero (num_waiters_need=0) at decision diamond 14. If there are no sleeping or woken threads at the decision diamond 14, then the algorithm is done.

If there are threads waiting to use resources at the decision diamond 14, the algorithm determines if the semaphore has enough resources available to satisfy the demand for all of the threads that have been woken, but have not executed, and enough resources for the sleeping thread at the front of the wait queue at decision diamond 16. The algorithm keeps a count of the resources needed by the threads that have been woken up, but have yet to decrement the semaphore resource count because they have not run, as the threads are woken up to use the available resources. The algorithm will only wake up threads if there are resources available for them.

If there are not enough resources for the thread at the front of the wait queue at the decision diamond 16, then the algorithm is done. If resources are available for the sleeping thread at the front of the wait queue, the semaphore will wake up the first sleeping thread and will increase the count of the resources for the threads that have been woken by the number that the thread needs at box 18. The algorithm then determines whether the semaphore's wait queue is empty at decision diamond 20, and if it is empty, then the algorithm is done. However, if there are more threads sleeping on the wait queue, then the algorithm returns to the decision diamond 16 to determine whether the number of resources that are available minus the number of resources needed by the already woken threads is greater than the resources needed by the next sleeping thread in the wait queue. In this way the algorithm keeps track of the resources needed by the woken threads that have not yet run by limiting the number of threads that are woken relative to the resources that are available.

Figure 2A:
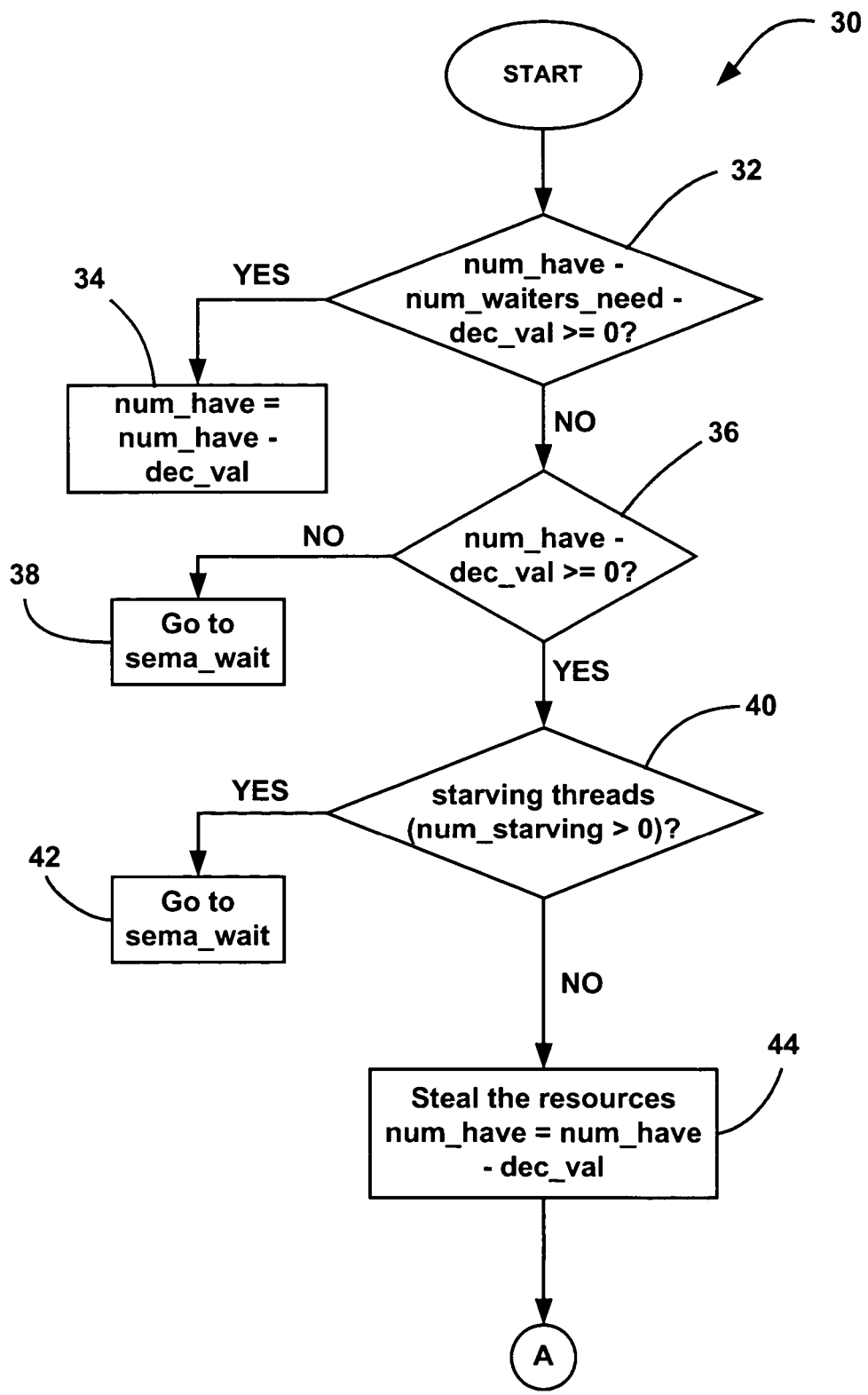
FIGS. 2A and 2B are flow chart diagrams showing one process for decrementing resources in a counting semaphore, according to an embodiment of the present invention.
Figure 2B:
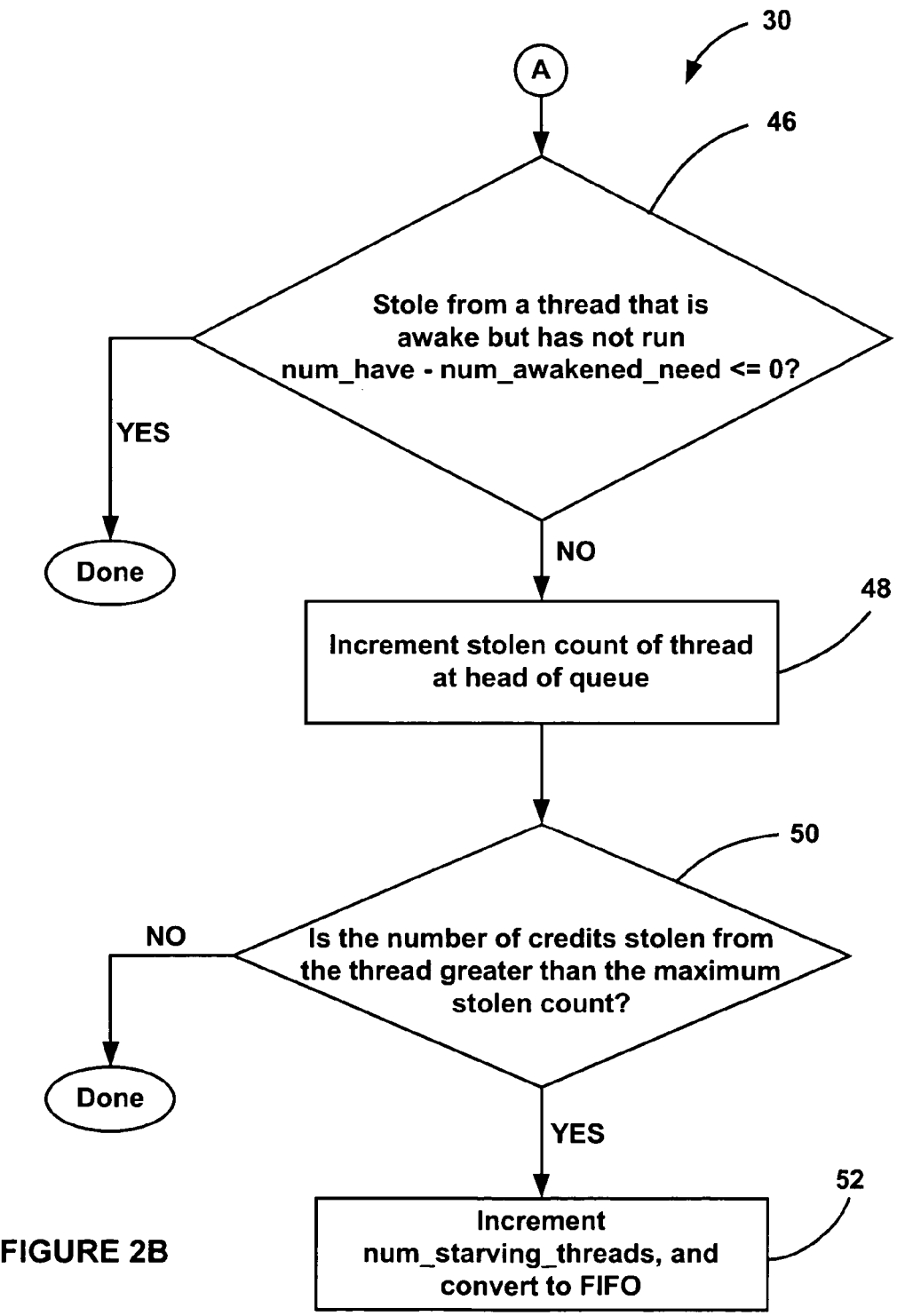

FIGS. 2A and 2B are a flow chart diagram 30 that shows one process for when the semaphore's resources are decremented, according to an embodiment of the invention. The algorithm determines whether the number of resources that are currently available in the semaphore is enough to satisfy all of the threads that are sleeping on the wait queue and the threads that have been woken, but have not yet taken the resource (pending decrement), minus the number of resources that the new incoming thread may need (num_have−num_waiters_need−dec_val) at decision diamond 32. If there are enough resources for all of the threads that are on the wait queue, the woken threads that have pending decrements and the new thread that wants to take one or more of the resources at the decision diamond 32, then the algorithm allows the new thread to take the resources, and then decrements the number of resources that are available at box 34. The decrement algorithm is then done. In this case, the new thread has not stolen a resource.

If there are not enough resources for all of the threads on the wait queue, all of the woken threads that have a pending decrement and the new thread at the decision diamond 32, then the algorithm determines whether there are enough resources available for the new thread to steal at decision diamond 36. In other words, the algorithm determines whether the semaphore has enough resources to satisfy the new thread only. If there are not enough resources available for the new thread to steal at the decision diamond 36, then the new thread is placed at the end of the wait queue (sema_wait) at box 38 and becomes part of the variable num_waiters_need.

If there are enough resources available for the new thread, it then has an opportunity to steal the ones it needs. As discussed above, the algorithm does not allow a new thread to steal resources if there are one or more starving threads. A thread will be starving if it has already had too many resources stolen from it while waiting on the semaphore before it has had a chance to run. Each time a resource is stolen from a thread, the algorithm increments the thread's stolen resource count. When the count reaches a predetermined maximum number, the thread is starving. The predetermined number is application specific for different operating systems.

The algorithm determines whether there are starving threads (num_starving>0) at decision diamond 40. If there is a starving thread at the decision diamond 40, then the new thread is put at the end of the wait queue at box 42 because no stealing is allowed. If one or more of the threads in the semaphore has a stolen resource count equal to the predetermined maximum number, then the semaphore is operating in the FIFO mode that does not allow stealing. The starving thread should be at the front of the wait queue waiting for enough resources to be returned. If there are no starving threads at the decision diamond 40, then the algorithm allows the new thread to steal the resources, and the number of available resources is decremented (num_have=num_have−dec_val) at box 44.

The algorithm then determines whether the new thread has stolen resources from a thread that has been woken, but not yet run, or a sleeping thread at the front of the wait queue (num_have−num_awakened_need≦0) at decision diamond 46. If the new thread has stolen resources from a thread that has been woken, but not yet run, then the algorithm is done because when that thread does get CPU access and returns to get the resource, it will not be available. That thread will then increment its stolen resource count and return to the end of the wait queue, unless it is now a starving thread, in which case it will go to the front of the wait queue. If the new thread did not steal the resources from a woken thread, but stole the resources from the sleeping thread at the front of the wait queue, the sleeping thread's stolen resource count is incremented by the number of resources stolen from it at box 48.

The algorithm then determines whether the stolen resource count of the thread at the front of the wait queue has reached the predetermined maximum number at decision diamond 50. If the stolen resource count of the sleeping thread has not reached the maximum number, then the algorithm is done. However, if the thread at the front of the wait queue is now a starving thread, the algorithm increments the number of starving threads (num_starving_threads) and converts to the FIFO mode at box 52. The algorithm keeps track of the number of starving threads so that it knows when it can convert back to the stealing mode from the FIFO mode. As long as the starving thread count is greater than zero, the semaphore prevents stealing of the resources.

Figure 3A:
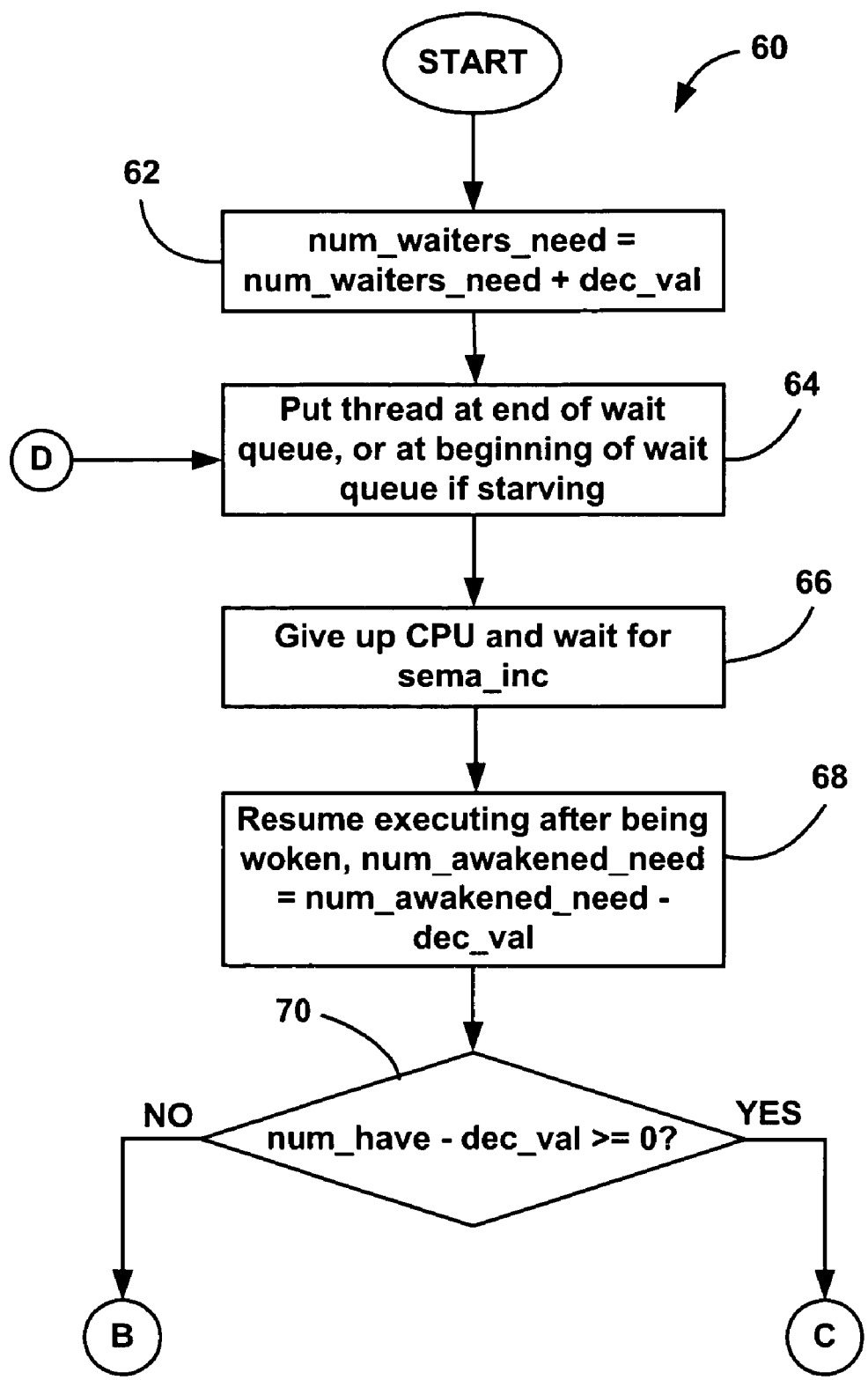
FIGS. 3A and 3B are flow chart diagrams showing one process for putting a thread in a counting semaphore's wait queue, according to an embodiment of the present invention.
Figure 3B:
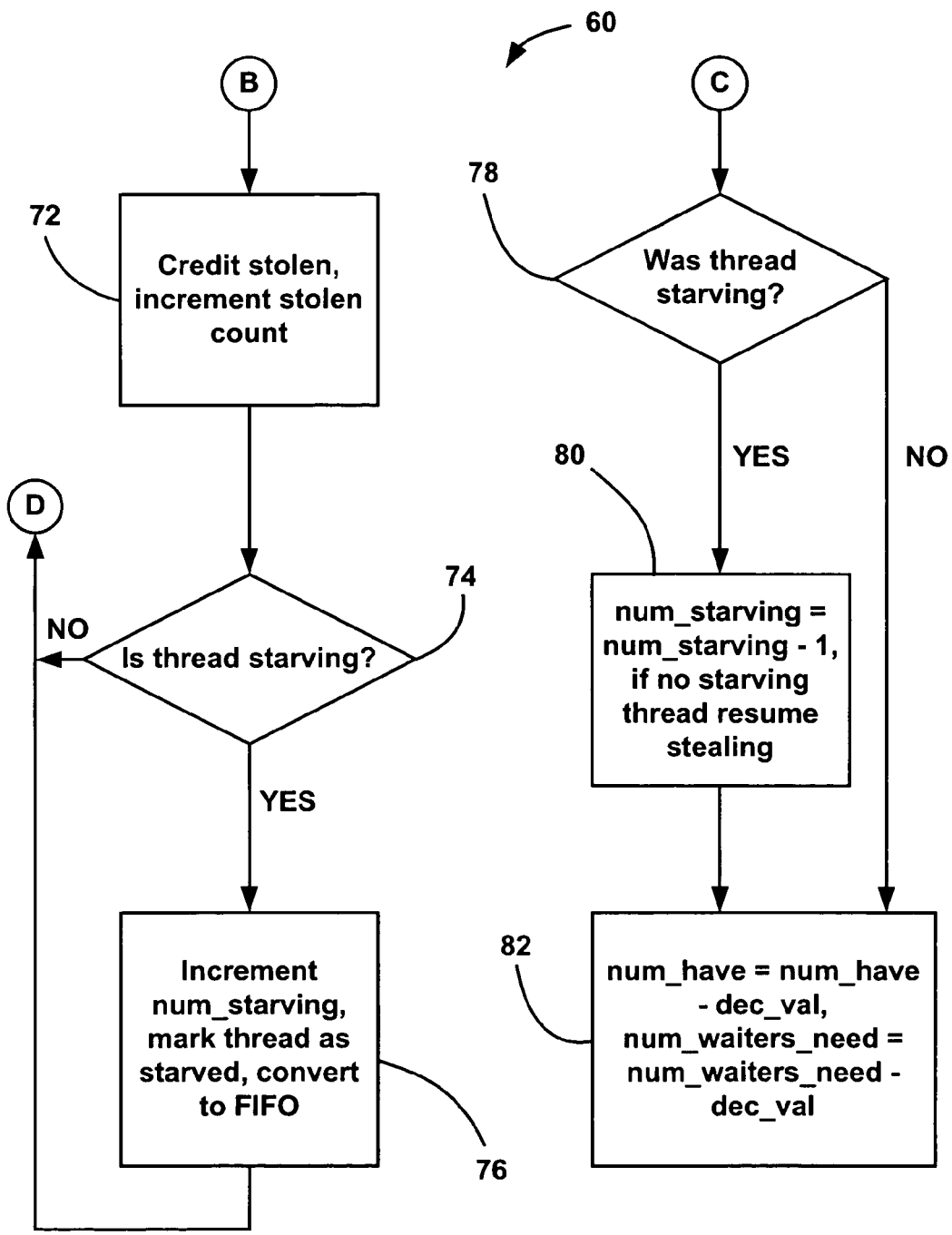

FIGS. 3A and 3B are a flow chart diagram 60 showing one process where a new thread is put to sleep at the end of the semaphore's wait queue because there are not enough resources available for that thread or the semaphore is operating in the FIFO mode, according to an embodiment of the invention. The algorithm first increments the number of resources needed by the sleeping threads in the wait queue by the number that the new thread needs (num_waiters_need=num_waiters_need+dec_val) at box 62. The algorithm then puts the new thread at the end of the wait queue at box 64. When the new thread is put at the end of the wait queue at the box 64, the thread gives up the CPU it was using to execute its program, and will wait for resources to become available per the flow chart diagram 10 at box 66.

When a resource does become available to a sleeping thread, it is woken up at box 68. When the woken thread gets a CPU, the algorithm also decrements the count of the number of resources needed for the threads that have been woken up, but have not yet run (num_awakened_need=num_awakened_need−dec_val) at the box 68. The algorithm then determines whether there are enough resources available for the thread that has been woken up at decision diamond 70. If there are not enough available resources for the woken thread at the decision diamond 70, the algorithm determines that another thread has already stolen the resources that were originally destined for it when it was woken up, and it increments its stolen resource count at box 72. The thread that lost the resource then determines whether it is now a starving thread by determining whether its stolen resource count has reached the predetermined maximum number at decision diamond 74. If the stolen resource count has not reached the maximum number and the thread is not starving at the decision diamond 74, the algorithm returns to the box 64 where the thread is put at the end of the wait queue. However, if the stolen resource count for the thread has reached the maximum number at the decision diamond 74 and it is now a starving thread, the starving thread count is incremented by one and the algorithm converts to the FIFO mode at box 76. The algorithm then puts the starving thread at the beginning of the wait queue at the box 64.

If there are enough resources for the woken thread that now has a CPU at the decision diamond 70, the algorithm determines whether it was previously starving at decision diamond 78. If the thread was previously a starving thread, the algorithm decrements the number of starving threads (num_starving=num_starving−1) at box 80. Additionally, the algorithm will determine if the starving thread count is zero, and if so, convert back to the stealing mode at the box 80. The algorithm then decreases the number of resources that the semaphore has (num_have=num_have−dec_val) and decreases the number of resources needed by the waiting threads (num_waiters_need=num_waiters_need−dec_val) at box 82. If the thread that used the resources at the decision diamond 78 was not a starving thread, the algorithm goes directly to the box 82 to decrease the number of resources that the semaphore has and decrease the number of resources needed by the waiting threads.

The foregoing discussion discloses and describes merely exemplary embodiments of the present invention. One skilled in the art will readily recognize from such discussion, and from the accompanying drawings and claims, that various changes, modifications or variations can be made therein without departing from the spirit and scope of the invention as defined in the following claims.

What is claimed is:

1. A computer-implemented method for allocating a plurality of resources to a plurality of threads in a counting semaphore that protects the plurality of resources, said method comprising:
   maintaining a count of how many of the resources the semaphore currently has available for the threads;
   putting one of the threads to sleep on a wait queue if the semaphore does not have enough of the protected resources that are available to satisfy the one of the threads;
   waking the sleeping thread up from the wait queue if the protected resources become available for the sleeping thread;
   allowing other threads to steal the protected resources from the woken thread before the woken thread can execute;
   allowing a starving one of the threads to be woken and execute if the starving one of the threads has had more than a predetermined maximum number of the protected resources stolen from it;
   allowing other threads to steal resources from the sleeping thread on the wait queue if the sleeping thread needs the plurality of protected resources and the semaphore has fewer of the protected resources available than the sleeping thread needs; and
   maintaining a count of the number of the protected resources that are stolen from one of the threads to determine if the thread is starving.

2. The method according to claim 1 further comprising returning to allowing threads to steal resources when the starving one of the threads uses the resources.

3. The method according to claim 1 further comprising determining whether one of the protected resources is stolen from one of the threads at the front of the wait queue or from one of the threads that has been woken up from the wait queue and is waiting to execute.

4. The method according to claim 1 further comprising maintaining a count of how many of the protected resources are needed by the threads that have been woken from the wait queue and are waiting to execute.

5. The method according to claim 4 further comprising waking up one of the threads at a front of the wait queue only if the number of protected resources that the semaphore has is enough to satisfy all of the threads that have been woken, but have not executed, and the thread at the front of the wait queue.

6. The method according to claim 1 further comprising maintaining a count of how many of the protected resources the sleeping ones of the threads and the woken ones of the threads have attempted to get from the semaphore, but have failed.

7. The method according to claim 1 further comprising maintaining a count of the number of the threads that are starving.

8. The method according to claim 1 wherein allowing a starving one of the threads to be woken and execute includes putting the starving one of the threads at a front of the wait queue.

9. The method according to claim 1 wherein the method is used in a computer operating system.

10. The method according to claim 9 wherein the operating system is a UNIX operating system.

11. A computer-implemented method for allocating a plurality of resources to a plurality of threads in a counting semaphore that protects the plurality of resources, said method comprising:
   operating in a stealing mode where one of the threads can steal the protected resources from the other threads when none of the threads is starving for any of the protected resources, wherein operating in the stealing mode includes allowing threads to steal the protected resources from a sleeping one of the threads on a wait queue if the sleeping thread needs more than one of the protected resources and the semaphore has less of the protected resources than the sleeping thread needs;
   operating in a first-in first-out mode when one or more of the threads are starving for any of the protected resources; and
   maintaining a count of the number of the protected resources that are stolen from one of the threads to determine if the thread is starving.

12. The method according to claim 11 wherein operating in the stealing mode includes allowing threads to steal the protected resources from a woken one of the threads that was previously sleeping on a wait queue before the woken one of the threads can execute.

13. The method according to claim 11 further comprising maintaining a count of how many of the protected resources sleeping ones of the threads on a wait queue, and woken ones of the threads, have attempted to get from the semaphore, but have failed.

14. The method according to claim 11 further comprising putting a starving one of the threads at the front of a wait queue.

15. A computer-implemented method for allocating a plurality of resources to a plurality of threads in a counting semaphore that protects the plurality of resources, said method comprising:
   maintaining a count of how many of the protected resources the semaphore currently has available for the threads;
   putting one of the threads to sleep on a wait queue if the semaphore does not have enough of the protected resources available to satisfy the one of the threads;
   waking the sleeping thread up from the wait queue if the protected resources become available for the sleeping thread;
   maintaining a count of how many of the protected resources are needed by the ones of the threads that have been woken from the wait queue and are waiting to execute;
   maintaining a count of how many of the protected resources the sleeping ones of the threads and the woken ones of the threads have attempted to get from the semaphore, but have failed;
   allowing other ones of the threads to steal the protected resources from a particular woken one of the threads before the particular woken one of the threads can execute;
   allowing other ones of the threads to steal the protected resources from a particular sleeping one of the threads at a front of the wait queue if the particular sleeping one of the threads needs the protected resources and the semaphore has fewer of the protected resources available than the particular sleeping one of the threads needs;
   maintaining a count of the number of the protected resources that are stolen from one of the threads to determine if the thread is starving;
   allowing a starving one of the threads to be woken and execute if the starving one of the threads has had more than a predetermined number of the protected resources stolen from it, wherein allowing the starving one of the threads to be woken and execute includes putting the starving one of the threads at the front of the wait queue; and returning to allowing the threads to steal the protected resources when the starved one of the threads uses the protected resources.

16. The method according to claim 15 further comprising waking up one of the threads at the front of the wait queue only if the number of the protected resources that the semaphore has available is enough to satisfy all of the threads that have been woken, but have not executed, and the thread at the front of the wait queue.

17. The method according to claim 15 further comprising maintaining a count of the number of the threads that are starving.

* * * * *